(12) United States Patent
Kuznar et al.

(10) Patent No.: US 10,640,971 B1
(45) Date of Patent: May 5, 2020

(54) ACOUSTICAL PANEL FRAME

(71) Applicant: Vomela Specialty Company, St. Paul, MN (US)

(72) Inventors: Kevin Kuznar, Apple Valley, MN (US); Barry Childs, Hastings, MN (US)

(73) Assignee: Vomela Specialty Company, St. Paul, MN (US)

( * ) Notice: Subject to any disclaimer, the term of this patent is extended or adjusted under 35 U.S.C. 154(b) by 0 days.

(21) Appl. No.: 16/367,410

(22) Filed: Mar. 28, 2019

Related U.S. Application Data

(60) Provisional application No. 62/649,378, filed on Mar. 28, 2018.

(51) Int. Cl.
| | |
|---|---|
| *B32B 37/02* | (2006.01) |
| *E04B 1/84* | (2006.01) |
| *E04B 9/00* | (2006.01) |
| *E04B 9/04* | (2006.01) |
| *E04F 13/075* | (2006.01) |
| *B32B 3/26* | (2006.01) |
| *B32B 5/18* | (2006.01) |
| *B32B 15/20* | (2006.01) |

(Continued)

(52) U.S. Cl.
CPC ............ *E04B 1/8409* (2013.01); *B32B 3/266* (2013.01); *B32B 5/18* (2013.01); *B32B 15/046* (2013.01); *B32B 15/20* (2013.01); *B32B 37/182* (2013.01); *B32B 38/04* (2013.01); *B32B 38/145* (2013.01); *E04B 9/001* (2013.01); *E04B 9/045* (2013.01); *E04F 13/075* (2013.01); *B32B 2038/042* (2013.01); *B32B 2307/102* (2013.01); *B32B 2419/00* (2013.01)

(58) Field of Classification Search
CPC ........ E04B 1/8409; E04B 9/001; E04B 9/045; B32B 38/145; B32B 15/046; B32B 15/20; B32B 38/04; B32B 5/18; B32B 3/266; B32B 37/182; B32B 2419/00; B32B 2038/042; B32B 2307/102; E04F 13/075
See application file for complete search history.

(56) References Cited

U.S. PATENT DOCUMENTS

| | | | |
|---|---|---|---|
| 2002/0053176 A1* | 5/2002 | Colson | B31D 3/00 52/506.06 |
| 2005/0211500 A1* | 9/2005 | Wendt | E04B 9/001 181/295 |

(Continued)

OTHER PUBLICATIONS

GraphicsDisplayUSA, "Dibond:Aluminum Composite Material", https://graphicdisplayusa.com/products/dibond/, Nov. 2017.

(Continued)

*Primary Examiner* — Jun S Yoo
(74) *Attorney, Agent, or Firm* — Haugen Law Firm PLLP

(57) ABSTRACT

An acoustical panel apparatus includes a laminate panel substrate that is receptive to ink printing operations. The substrate may be provided with folding grooves to form an apertured base, a sidewall, and an inner wall which together define a receptacle. An acoustical tuning body is positionable at the receptacle to attenuate at least one of sound transmissions and sound reflections from sound passing through the apertures in the base. A mounting bracket is attached to the panel to secure the acoustical tuning body at the receptacle and for mounting the panel substrate to a wall or ceiling.

10 Claims, 5 Drawing Sheets

(51) Int. Cl.
*B32B 38/00* (2006.01)
*B32B 38/04* (2006.01)
*B32B 37/18* (2006.01)
*B32B 15/04* (2006.01)

(56) References Cited

U.S. PATENT DOCUMENTS

| | | | | |
|---|---|---|---|---|
| 2006/0048659 A1* | 3/2006 | Colson | ............... | B32B 3/16 |
| | | | | 101/272 |
| 2010/0080941 A1* | 4/2010 | McCarville | ............ | B29C 70/30 |
| | | | | 428/34.1 |
| 2015/0343720 A1* | 12/2015 | Miller | ............... | B64C 3/20 |
| | | | | 428/124 |
| 2017/0130456 A1* | 5/2017 | Bergman | ............ | E04B 9/04 |

OTHER PUBLICATIONS

GraphicsDisplayUSA, "Arizona Print Specialists Choose Dibond Aluminum Composite for Substrate of Choice", https://graphicdisplayusa.com/blog/arizona-print-specialists-choose-dibond-aluminum-composite-for-substrate-of-choice/ Jul. 8, 2017.

GraphicsDisplayUSA, "Michigan Fabricator Stumbles Upon Dibond for Carefully Milled Corporate Signage",https://graphicdisplayusa.com/blog/michigan-fabricator-stumbles-upon-dibond-for-carefully-milled-corporate-signage/ Sep. 9, 2017.

GraphicsDisplayUSA, "Artisan Creates Dibond Promotional Bar Top Fridges for Red Bull", https://graphicdisplayusa.com/blog/artisan-creates-dibond-promotional-bar-top-fridges-for-red-bull/, Feb. 15, 2017.

\* cited by examiner

ACOUSTICAL PANEL FRAME

FIELD OF THE INVENTION

The present invention relates to wall and ceiling systems generally, and more particularly to a framing and paneling system for securing acoustical tuning materials upon or in proximity to a wall or ceiling.

BACKGROUND OF THE INVENTION

Acoustical tuning materials, such as acoustical foam layers, have traditionally been applied in connection with panels fabricated from wood or metal. Such panels can be expensive to produce and reproduce, and may also have limitations to their aesthetic appeal. While wood panels may be aesthetically desirable for certain applications, manufacturing wood panels to consistent dimensions with tight tolerances can be a challenge. Moreover, the natural woodgrain patterning is difficult to reproduce in the event of panel breakage during shipment or installation, such that replacement of the broken frame may not be straightforward.

Metal framing panels, while more readily reproducible, typically have aesthetic limitations, particularly to their surface finishes. Furthermore, metal paneling frames may present weight challenges for certain applications such as suspended ceilings.

It is therefore an object of the present invention to provide an acoustical panel frame wherein the frame is lightweight, reproducible, and may be provided with a variety of surface finishes.

It is another object of the present invention to provide an acoustical panel frame that is transportable in a compact configuration, but easily shaped into an installation configuration at the installation site.

It is a further object of the present invention to provide an acoustical panel frame that meets interior construction code requirements, including ASTM E84 smoke and fire ratings.

It is yet another object of the present invention to provide an acoustical panel frame that may be printed upon by digital printing or screen printing

DESCRIPTION OF THE INVENTION

The objects and advantages enumerated above together with other objects, features, and advances represented by the present invention will now be presented in terms of example embodiments described with reference to the attached drawing figures which are intended to representative of various possible embodiments of the invention. Other embodiments and aspects of the invention are recognized as being within the grasp of those having ordinary skill in the art.

Figure 6:
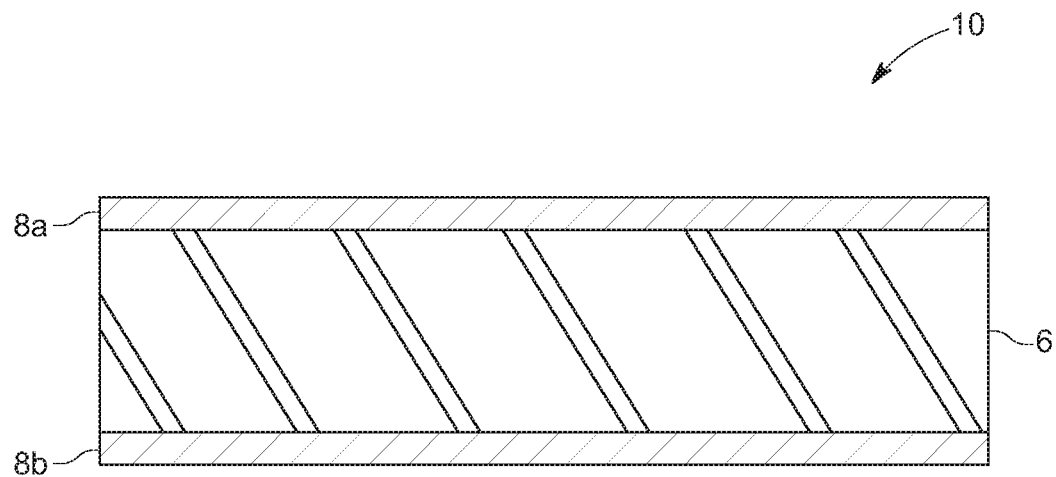
FIG. 6 is a cross-sectional view of an acoustical panel frame.

Though a variety of substrate materials are contemplated as being useful in the manufacture of the acoustical panel frames of the present invention, applicant has determined that aluminum composite laminate substrates represent a preferable material. Typically, aluminum composite substrates include thin outer surface layers of aluminum or aluminum alloys laminated on opposing surfaces of a polymer core layer. The resultant sheet is both lightweight and strong, and is receptive to conventional ink printing processes for application of graphics upon one or more outer surfaces of the substrate. FIG. 6 illustrates an example laminate construction of acoustical panel 10 of the present invention, including polymer core layer 6 and first and second outer surface layers 8a, 8b. An example aluminum composite substrate is available from 3A Composites GmbH under the trade name DIBOND®. Such material is receptive to digital printing, screen printing, and other graphics and graphical material applications, and is relatively lightweight while dimensionally stable. Other aluminum composite substrates are commercially available as alternative substrate materials. It is further contemplated that substrates other than aluminum composites may be employed in the acoustical panel frames of the present invention, so long as such substrate materials meet physical property characteristics suitable for the intended application.

An example acoustical panel frame 10 may be prepared by initially printing a graphical pattern, image, or indicia upon an aluminum composite substrate, such as a three millimeter DIBOND® panel. The graphical printing may be performed digitally with a UV-curable ink, or through other suitable printing techniques.

Figure 1:
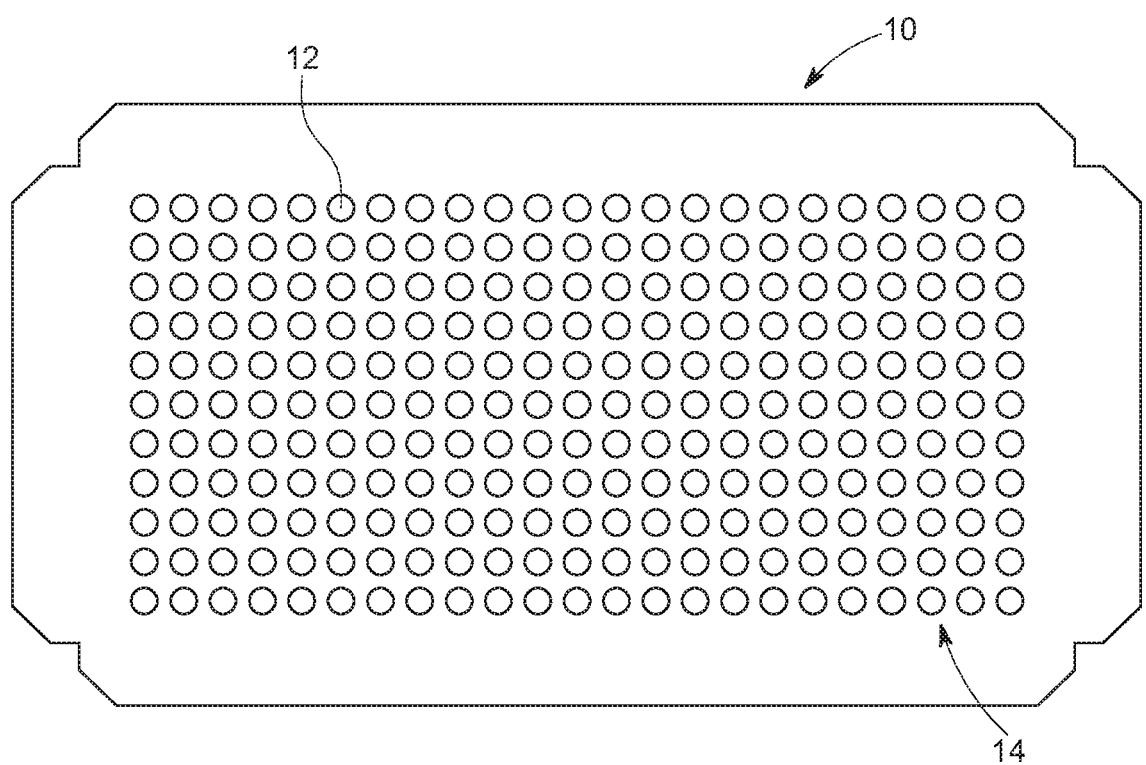
FIG. 1 is a top view of an acoustical panel substrate following die-cutting and hole punching.
Figure 7:
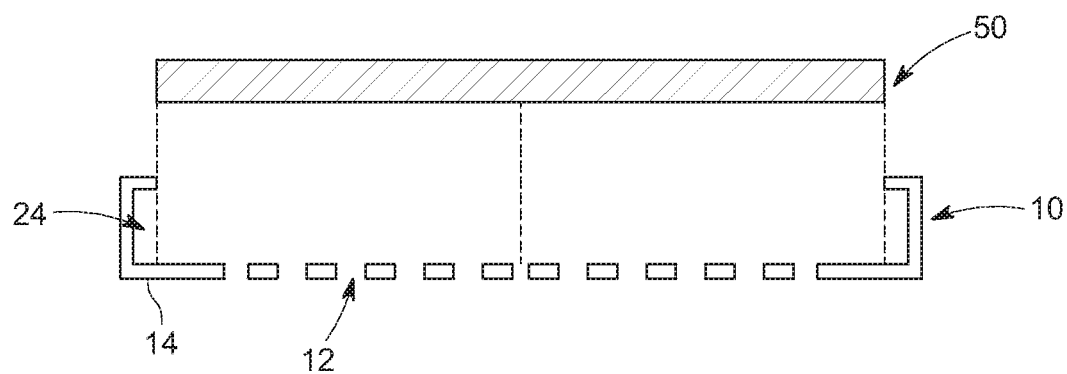
FIG. 7 is a cross-sectional view of an acoustical tuning body being received in an acoustical panel frame.

The printed substrate may then be die-cut to a pre-form configuration illustrated in FIG. 1. In this embodiment, a series of holes 12 may be punched or cut from an area of the printed panel used to support acoustical tuning material, illustrated as base 14. The number and/or size of holes 12 in the array of holes in the panel 10 may be adjusted to suit the aesthetics and acoustical performance desired in the particular application. The holes 12 are presented to permit sound to pass through a portion of the panel and interact with acoustical tuning material 50 in the finished installation. FIG. 7 is a cross-sectional view of acoustical tuning material being installed at acoustical panel frame 10.

Figure 2:
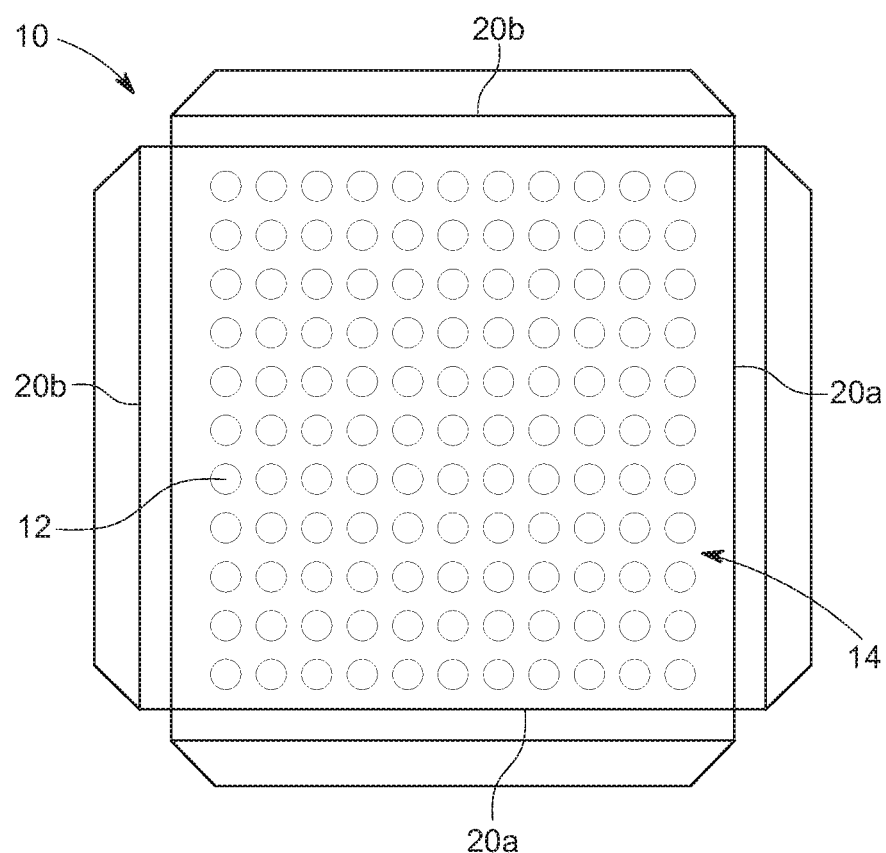
FIG. 2 is a top view of an acoustical panel frame following routing to form folding grooves.
Figure 3:
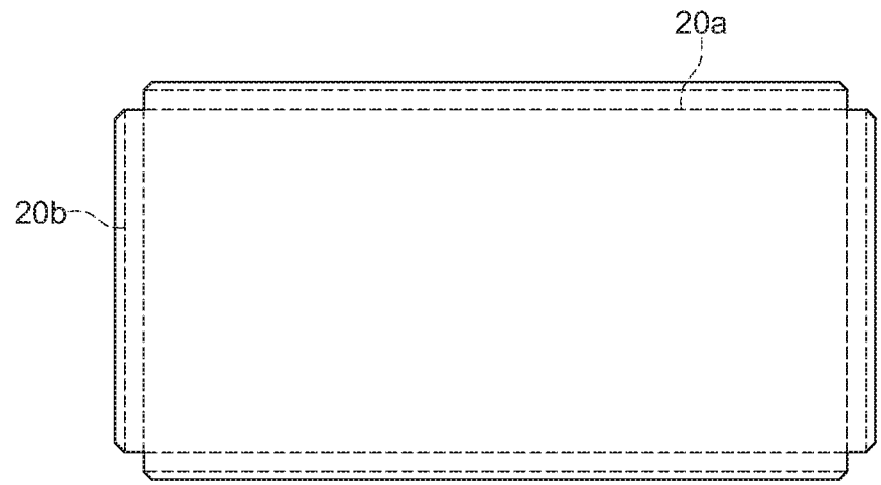
FIG. 3 is a top view of an acoustical panel frame.

The die-cut and hole-punched printed panel may then be prepared with folding grooves 20a, 20b as shown in FIGS. 2 and 3. The folding grooves 20a, 20b may be prepared with a router, and may, in some embodiments, be prepared with a substantially "V"-shaped profile. The routed folding grooves 20a, 20b permit panel 10 to be folded into the configuration illustrated in FIG. 4, with base 14 delineated from sidewall 16 by folding groove 20a, and sidewall 16 delineated from inner wall 18 by folding groove 20b. Corner brackets 30, such as those illustrated in FIGS. 4 and 5 may be installed at the folded corners of the panel frame 10, both to secure the acoustical tuning material 50 at receptacle 24 of panel frame 10, as defined by base 14, sidewall 16, and inner wall 18, as well as to provide a hang point to suspend or otherwise mount the panel frame 10 to a wall or a ceiling.

Figure 4:
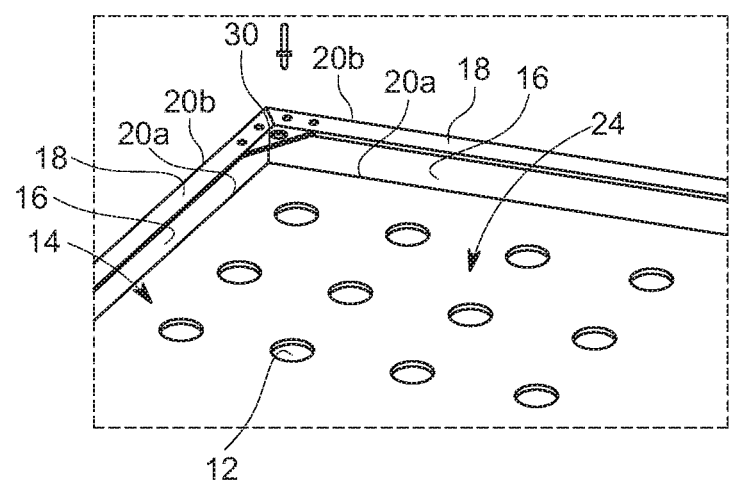
FIG. 4 is a perspective view of a portion of an acoustical panel frame following folding of the sides about the folding grooves, and assembly of corner brackets to the frame.
Figure 5:
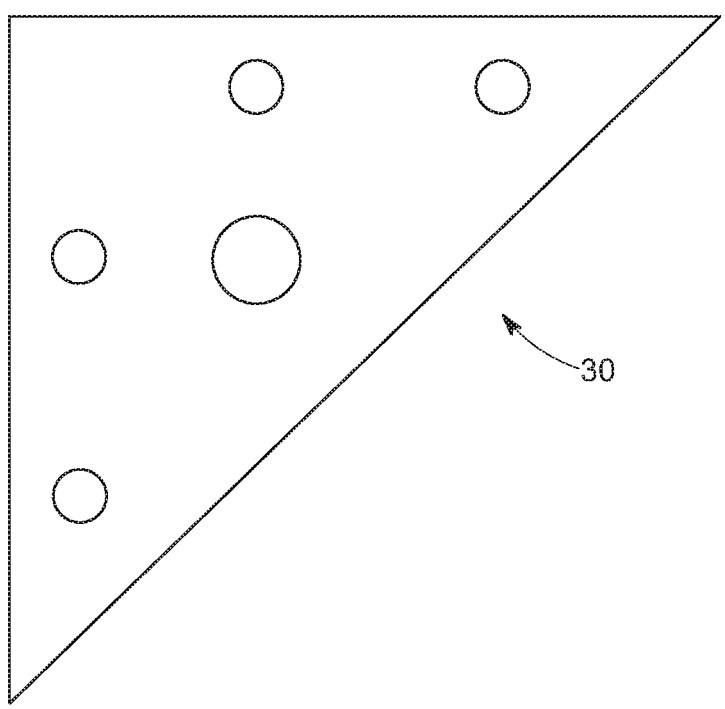
FIG. 5 is a top view of a corner bracket for use with an acoustical panel frame.

The panel frame 10 illustrated in FIG. 2 may be shipped in a flat condition, and subsequently shaped into the three-dimensional panel frame of FIG. 4 at the installation site. The corner brackets 30 may also be assembled to the panel frame at the installation site so that the acoustical tuning material 50 may be shipped together or apart with the panel frames 10, and installed with the configured panel frame at the installation site.

What is claimed is:

1. A method for preparing an acoustical panel, said method comprising:
    (a) providing a panel substrate comprising a laminate having a polymer core layer and first and second outer surface layers respectively secured to opposed sides of said polymer core layer, said outer surface layers being formed from aluminum or aluminum alloy;
    (b) printing a graphic upon said first outer surface layer;
    (c) forming a plurality of apertures in said panel substrate;
    (d) folding said panel substrate along folding grooves formed through said second outer surface layer, wherein the folded panel substrate includes a base and a sidewall extending substantially perpendicularly from said base, with the base and sidewall together defining a receptacle;
    (e) positioning an acoustical tuning body at the receptacle, wherein said acoustical tuning body is selected to attenuate at least one of transmission and reflection of sound passing though the apertures; and
    (f) attaching a mounting bracket to said panel substrate.

2. The method as in claim 1 wherein said mounting bracket secures said acoustical tuning body at the receptacle.

3. The method as in claim 2 wherein said acoustical tuning body comprises an open or closed cell foam.

4. The method as in claim 2 wherein the folded panel substrate includes an inner wall extending substantially perpendicularly from said side wall and parallel to and spaced from said base.

5. The method as in claim 4, including attaching said mounting bracket to said inner wall.

6. The method as in claim 1 wherein said folding grooves are substantially v-shaped and extend through said polymer core layer.

7. The method as in claim 1 wherein said plurality of apertures permit sound to interact with said acoustical tuning body.

8. The method as in claim 1, including printing the graphic by digital printing or screen printing.

9. The method as in claim 8 wherein the graphic is at least one of a pattern, an image, and an indicia.

10. The method as in claim 1, including mounting the panel substrate to a wall or ceiling with fasteners connected to said mounting bracket.

\* \* \* \* \*